United States Patent Office 3,414,714
Patented Dec. 3, 1968

3,414,714
METHOD AND MEANS FOR AUTOMATICALLY REGISTERING MERCHANDISE DATA
Martin Hergt, Bad Oeynhausen, and Albert Klaar and Emil Fenrich, Bielefeld, Germany, assignors to Anker-Werke Aktiengesellschaft, Bielefeld, Germany, a corporation of Germany
Filed Feb. 3, 1964, Ser. No. 342,857
12 Claims. (Cl. 235—61.6)

ABSTRACT OF THE DISCLOSURE

The method of entering merchandise data into a registering business machine includes attaching to each individually transportable unit of merchandise an electronic transmitter and radiating therefrom a code signal indicative of the data to be registered; moving the merchandise unit along a given path, the action range of the radiating signal being substantially limited to the vicinity of the moving unit along the path; receiving the code signal at a given locality of the path; and controlling the business machine in response to the received signal to register the merchandise data of the unit. A system for carrying out the foregoing method in combination with a registering business machine includes an electronic code-signal radiation transmitter attached, when in use, to one of respective units of merchandise and having a code signal indicative of the data to be registered for the merchandise unit; structure defining a given travel path for merchandise units, each of the transmitters having an effective action range substantially limited to the vicinity of the unit travelling on the path; an electronic receiver responsive to the signals at a given location along the path, and means connecting the receiver to the business machine for controlling it in response to the received signals to register the merchandise data of the unit.

---

Our invention relates to a method and means for automatically registering merchandise data in a cash register, accounting machine or other registering machine, particularly sales transaction data in supermarkets, self-service stores and the like.

The manual posting of such data by cashiers often results in crowding of customers at the check-out counters which may become excessive in rush hours. Rapid servicing at these counters, therefore, is a serious problem. As a remedy, the number of check-out counters, can be increased but this is uneconomical because more cashier personnel is required.

Attempts have been made to reduce delays by automating some of the check-out operations. Among these are the use of automatic change dispensers, mechanically conveying merchandise from the cashier's place to a wrapping counter, and similar auxiliaries contributing to a somewhat more expedient check-out servicing of customers.

Other proposals concern themselves with automatically registering the price of merchandise. According to one proposal of this type, the pricing of merchandise is effected by attaching a punch card or magnetic record carrier which is to be removed by the cashier and inserted into the cash register for controlling the latter. This, however, is susceptible to trouble because care must be taken to place the card or other record carrier with one side correctly positioned into the read-out device of the machine; and the manual insertion of the record carrier saves too little time in comparison with the direct manual posting of the amounts.

According to another automatic method of registering the prices of individual goods in the retail trade, the goods are provided with a label which carries rings impermeable to X-ray. The number and mutual spacing of the rings is indicative of the sales price. For registering the price, the labeled goods are passed through a photoelectric gate which causes X-rays or other suitable radiation to be projected upon a fluorescent picture screen so that the rings on the label are exhibited as enlarged ring-shaped or elliptical shadows. A system of photo cells then scans the value-denoting shadow rings and transmits corresponding pulses through transformers to receiving devices that take care of registering and totalizing these values.

The practical utility of such a system has remained questionable. When the identifying markings are being projected upon the screen, overlapping or obscuring disturbances may occur and then cause a faulty result. Furthermore, the use of X-rays is subject to legal limitations which exclude employing them in open spaces accessible to the public.

It is an object of our invention to provide a method and means for automatically registering merchandise data, such as sales prices, in a cash register or other business machine, while avoiding the shortcomings and disadvantages of the above-mentioned systems and devices heretofore proposed.

Accordingly, it is a more specific object of our invention to devise an automatic registering system for the purposes mentioned, that affords a more rapid and more accurate servicing of customers at check-out counters, particularly in self-service stores, thus minimizing or avoiding the necessity for additional personnel and additional space.

Another object, in conjunction with those mentioned, is to provide an automated price registering system that affords improved protection from theft or inadvertent nonpayment for goods taken by customers.

According to our invention, we attach to each individually transportable unit of merchandise an electronic transmitter of the microelectronic type having a radiating frequency signal indicative of the price or other merchandise data to be registered. When a merchandise unit carrying such a minute microtransmitter passes through the cashiers or other registering location while being forwarded along a given path as determined by a conveyor or check-out counter, the unit passes by a receiver which responds to the signal radiated from the transmitter and enters it, if necessary, through decoding equipment in form of the original data into a cash register, accounting machine or other business machine. The microtransmitter is then removed from the merchandise goods by the cashier.

According to another feature of our invention, we provide another receiver at the exit or exits so that the latter receiver will release a switching pulse in the event the customer attempts to pass through an exit with merchandise still carrying a transmitter, this being indicative of the fact that a theft is being attempted or that payment has been inadvertently not made or not registered. The receivers at such exits may serve to actuate a signal or to simultaneously block the exit.

According to still another feature of our invention, the microtransmitters on the merchandise stored on shelves or otherwise are normally inactive. That is the voltage source, such as a miniature dry or rechargeable cell, included in the transmitter is normally switched off with respect to the receiving circuits proper; and we provide the above-mentioned forwarding path for the merchandise near the check-out counter with a pulse transmitter, located in the travel direction ahead of the signal receiver. The pulse transmitter issues starting signals and thereby switches each microtransmitter on the merchandise to commence the transmitting operation shortly before the transmitter passes by the above-mentioned signal receiver.

The above-mentioned and further objects, advantages and features of our invention will be apparent from, and will be described in, the following in conjunction with an embodiment of the invention illustrated by way of example on the accompanying drawings in which.

Figure 1:
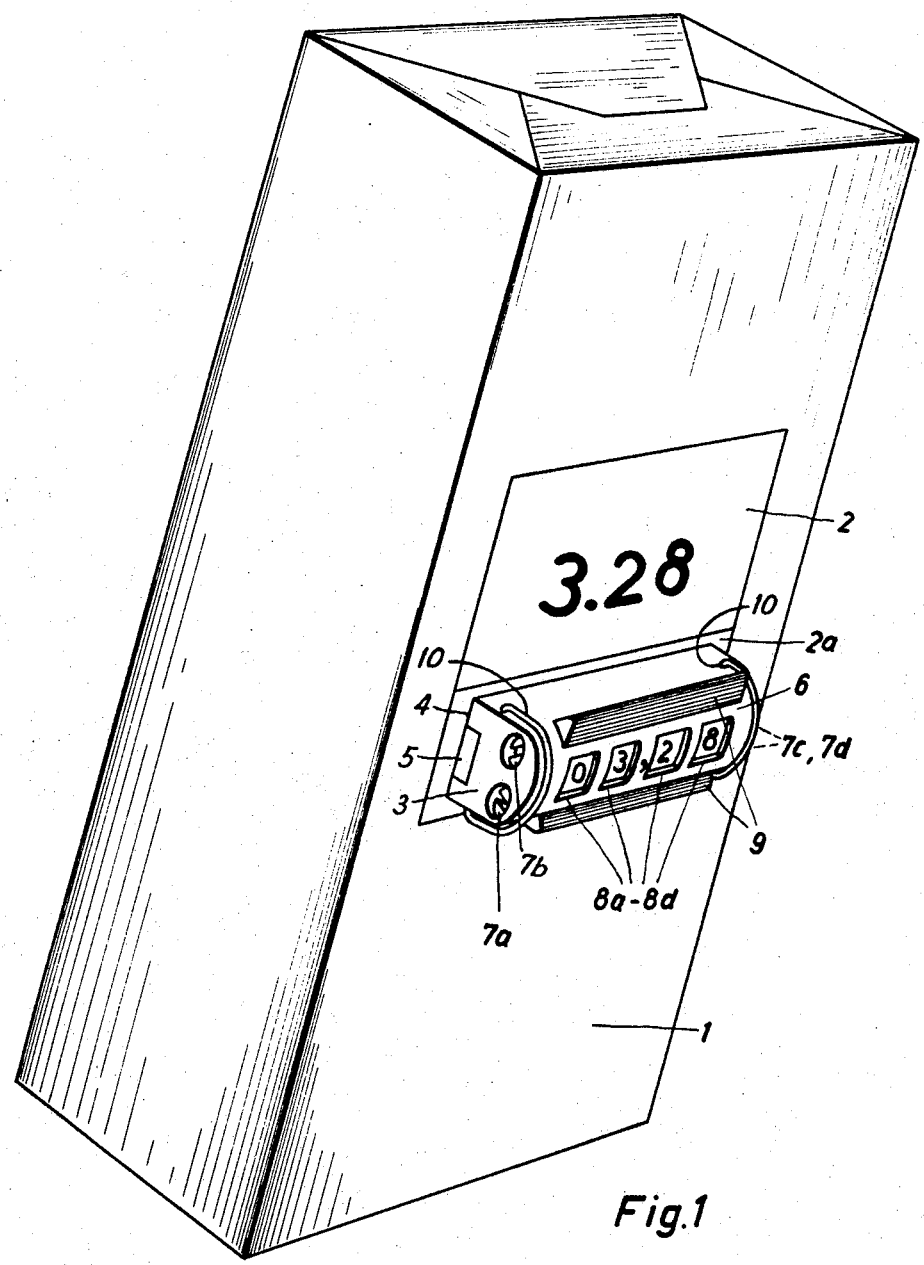
FIG. 1 shows in schematic perspective a packaged merchandise with a price tag and a microelectronic high-frequency transmitter.

The merchandise 1 (FIG. 1) to be sold is provided with a price tag 2 which, aside from showing in print or typing the price of the merchandise, carries also a microelectronic high-frequency transmitter 3. The transmitter 3 is removably fastened to the merchandise unit, for example on a tear-off portion 2a with which the tag 2 is provided. The action range of the transmitter 3 is limited, for example about 1 meter. Its radiating high-frequency signal is adjustable so that the signal is indicative of the sales price marked on the tag, as well as of any other identifying data, such as a particular department of the store, that may have to be registered. It is preferable for this purpose to make the transmitting frequencies of the transmitter adjustable so that it will issue a combination of frequencies jointly determining the price data. It is advisable to assign a given frequency to each full monetary unit, for example $1.00=1 mHz. (megacycles per second); $2.00=2 mHz., etc., and to assign respectively graduated intermediate frequencies to the intermediate values from 0.01 to 0.99 of the monetary unit, the graduation being 1/100 mHz. so that, for example, a frequency of 3090 kHz. (kilocycles per second) corresponds to a value of $3.09.

For limiting the frequency band of the transmitters, the full unit values may also be assigned to a carrier frequency, and the partial-unit values to a modulated frequency, or vice versa.

The microelectronic (sub-miniature) transmitter 3, being an encapsulated and transistorized unit, is reliably, although removably attached to the merchandise. For this purpose the housing of the transmitter has an externally planar base which can be glued or cemented to the prepared surface portion 2a of the price tag 2, or may be fastened by being stuck or clamped onto the tag or another portion of the wrapping material, or it may also be fastened magnetically. For the latter purpose, the base of the microtransmitter 3 is provided at its planar surface 4 with a permanent magnet 5, and the portion 2a of the tag 2 is laminated with an iron foil or similar magnetizable material. Another way of using a magnetic attachment is to place the tag 2 between a loose sheet-metal strip on or in the wrapping material and the attaching magnet 5 of the transmitter 3. Any other way of detachably fastening the microtransmitter 3 to the unit of merchandise 1 is likewise applicable.

The capsule 6 of the microtransmitter 3 in the embodiment according to FIG. 1 has a substantially semicircular cross section. Provided on each of the two end sides of the capsule are two adjusting devices 7a to 7b which in this embodiment consist of set screws that are accessible from the outside with the aid of a screwdriver. These devices serve for setting the transmission frequencies in accordance with the price data of the merchandise unit. The adjusting screws 7a to 7b act in the conventional manner upon trimmers such as capacitors, inductance coils, resistors or other circuit components of the transmitter and are also coupled with indicators which exhibit through window openings 8a to 8d the price data to which the frequency of the transmitter is adjusted. In the illustrated example, the adjusted data show a price of $3.28, corresponding to a transmitting frequency of 3280 kHz.

To facilitate removal of the transmitter 3 from the tag 2 by the cashier, the capsule 6 is provided with gripper ledges 9 which preferably also serve as transmitter antennas. For improving the stray field of the transmitted waves, the capsule 6 is further shown equipped with ring-shaped antennas 10 extending transverse to the antenna ledges 9.

Figure 2:
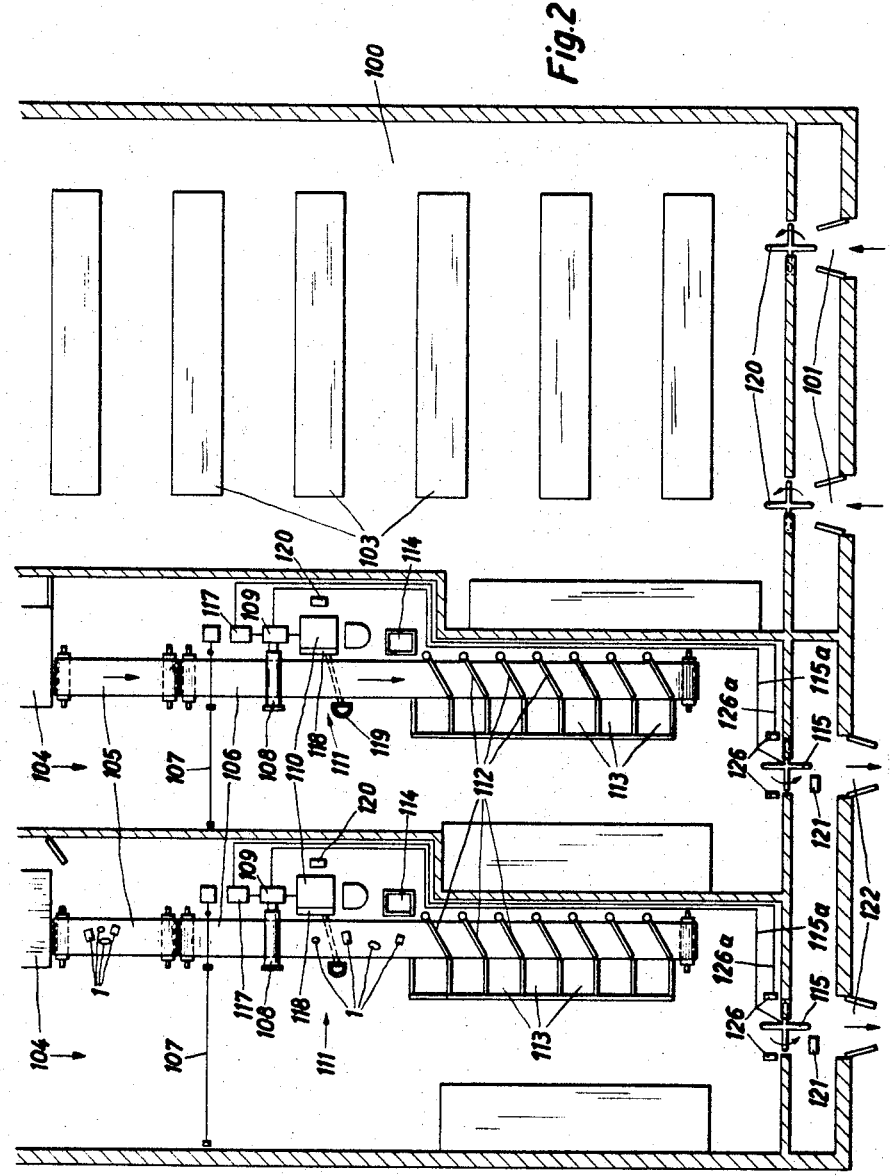
FIG. 2 shows schematically a plan view of part of a self-service store equipped with a system according to the invention.

The self-service store represented by a floor plan in FIG. 2 embodies a complete system for performing the method of price-data registration and theft protection according to the invention. Located behind the entrance doors 101 are unidirectionally rotatable turnstiles 102 to prevent customers from leaving the store through the entrances.

Merchandise units with microtransmitters as shown in FIG. 1, are accessible to the customers on shelves and racks 103. A customer, placing selected merchandise units into a basket or carriage, moves the purchases to one of the check-out localities 104 where the merchandise is placed upon a conveyor belt 105. The units of merchandise then travel from conveyor belt 105 onto a conveyor belt 106 which travels at higher speed than the conveyor 105 so that the merchandise units are automatically drawn apart from each other.

The units of merchandise 1 thus spaced on the conveyor belt 106 pass individually through the electric field of a pulse-issuing antenna 107 which extends across the entire width of the conveyor belt as well as across the adjacent walkway for the customers. The microtransmitter 3 is now switched on in the known manner by the pulse received from the antenna 107 and commences radiating its particular frequency in accordance with the price data of the merchandise.

During subsequent travel, the merchandise with the now active transmitter 3 passes through an antenna array 108 of the receiving device 109. The array 108 preferably comprises three antenna systems polarized at a right angle to each other and extends about the entire conveyor belt 106. The signals from the microtransmitter 3 received by the multiple antenna array 108 control in known manner the high-frequency amplifier stage and thereby the following stages of the receiver 109. Preferably three input transistors of the high-frequency amplifier stage are connected with the respective three antenna systems of the antenna system 108.

An automatically operating electronic antenna selector switch now selects the one antenna system that receives the signals at a sufficiently strong intensity, and simultaneously blocks the other two input transistors. If the microtransmitter 3 changes its position so that the signal in the then selected antenna system is not sufficient for satisfactory reception, a periodically operating sensing gauge causes the selector switch to select a different antenna system then furnishing a sufficient signal. In this manner, a reliable reception of the selected data-denoting frequency is secured.

Figure 5:
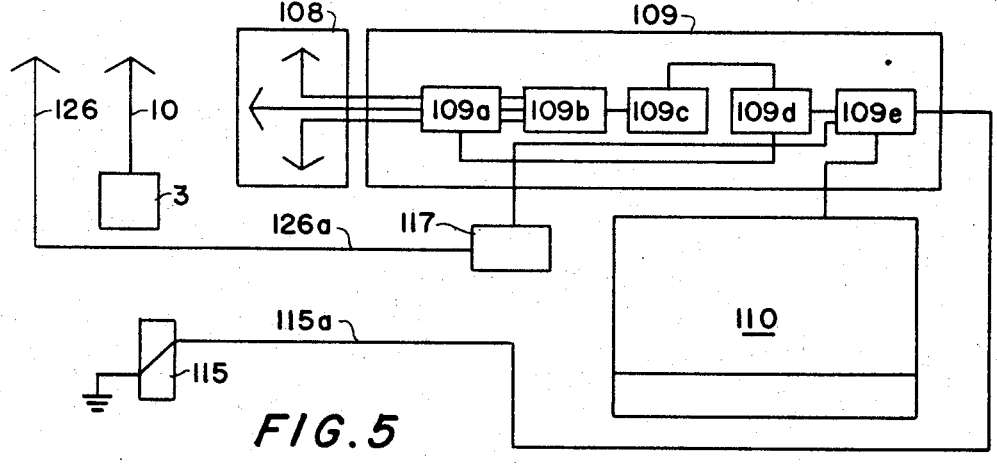
FIG. 5 is a block diagram of a receiver installation, suitable for the system according to FIGS. 1 and 2.

In the receiver 109 (FIGS. 2, 5) the signal received by the antenna array 108 is amplified in high-frequency amplifier stages 109a, 109b and is converted, in a frequency measuring stage and a pulse generator stage 109e, into digital signals that are issued to a cash register 110, an electronic computing device or another registering machine, where they are decoded and registered in known manner.

The cashier, seated at the location 111, has previously set one of a number of deflector switches 112 for passing the merchandise into a selected lay-off compartment 113, so that all merchandise purchased by one and the same customer is conveyed to a predetermined compartment at the wrapping counter.

As soon as the merchandise leaves the receiving antenna area 108, the cashier removes the microtransmitter 3 from the price tag 2 and places the transmitter into a collecting box 114 for re-use.

When the last unit of merchandise for a customer leaves the receiving antenna 108, a stop pulse is issued either manually by the cashier or automatically. Thereafter, a registering run of the cash register 110 is released to draw a subtotal for determining the sum of the sales prices for all merchandise units purchased, the amount of the sum being then exhibited to the customer and cashier on the indicator 118 of the cash register 110, as usual. The customer now tenders the amount to be paid. If the cash register is of the type that computes the amount of change due to the customer (U.S. Patent 3,049,288 or Re. 25,-431), the cashier posts the tendered amount into the machine. The machine automatically computes the amount of change which then is issued into a coin dispensing cup simultaneously with the issuance of a check or voucher.

After the customer has received the merchandise, no longer carrying any microtransmitters, he leaves the check-out space through the action range of the broad-band receiving antennas 126. Assume that the customer is still in possession of a merchandise unit containing an affixed microtransmitter 3. In this case, the antenna 126 receives the transmitted pulse and passes it through a receiver lead 126a to the receiver 117. As a result, a relay is closed and actuates, through the receiver output lead 115a, a latching device of an exit turnstile 115. Simultaneously a transparency 121 or other signal beyond the exit turnstile is lit, asking the customer to again return to the cashier for checking. In this manner the antennas 126 respond to removal of unpaid-for merchandise, thus minimizing the possibility of theft or errors.

As mentioned, the signal of the microtransmitter 3 need not be limited to an indication of the sales price but may also transmit other merchandise data by means of another adjustable frequency or frequency modulation. This can be used for registering, aside from the sales price, the type of merchandise or the sales department in the cash register as well as on the check or voucher being issued. Cash registers are usually equipped with special adding mechanisms which, in response to such additional merchandise data, permit separately recording the daily turnover with respect to individual kinds of merchandise for statistical and accounting purposes.

The internal circuitry of microelectronic transmitters suitable for the purpose of the invention will be described presently with reference to FIGS. 3 and 4.

Figure 3:
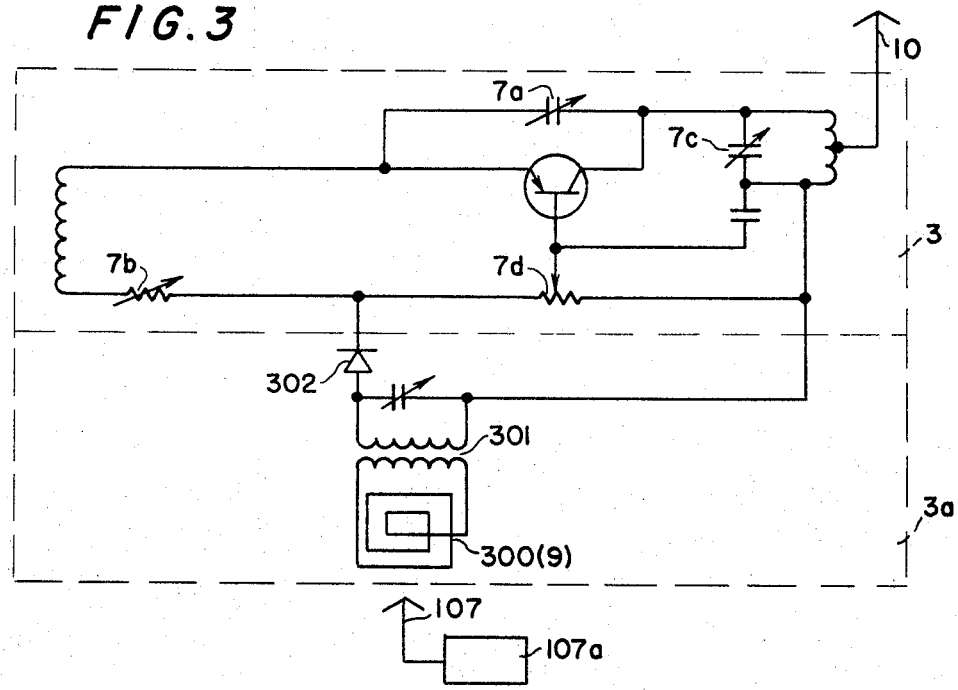
FIGS. 3 and 4 show respective circuit diagrams of two microelectronic high-frequency transmitters.

The high-frequency transmitter 3 shown in FIG. 3 does not contain its own current source, but is energized by wave energy from the antenna 107 of a continuously operating transmitter 107a. For this purpose, the transistorized subminiature transmitter 3 proper is equipped with an alternating-current receiver stage 3a which issues a direct current to the transmitter 3. In the illustrated example, the receiver stage 3a comprises an antenna 300 (9) which is accommodated within the gripper ledges 9 of the transmitter 3 shown in FIG. 1. The receiving antenna 300 is coupled with a tank circuit 301 tuned to the frequency of the wave energy issuing from the antenna 107. The resulting alternating current is rectified by a diode 302 and supplied to the transmitter stage proper. The transmitter 3 comprises adjustable capacitors 7a, 7c and adjustable resistor 7b, 7d (FIG. 3) which can be set by the correspondingly denoted adjusting means 7a to 7d (FIG. 1), to set the radiating frequency of the transmitter 3 to a value proportional to the price or other merchandise data to be registered, this frequency being radiated from the antenna 10 (FIGS. 3, 1).

Figure 4:
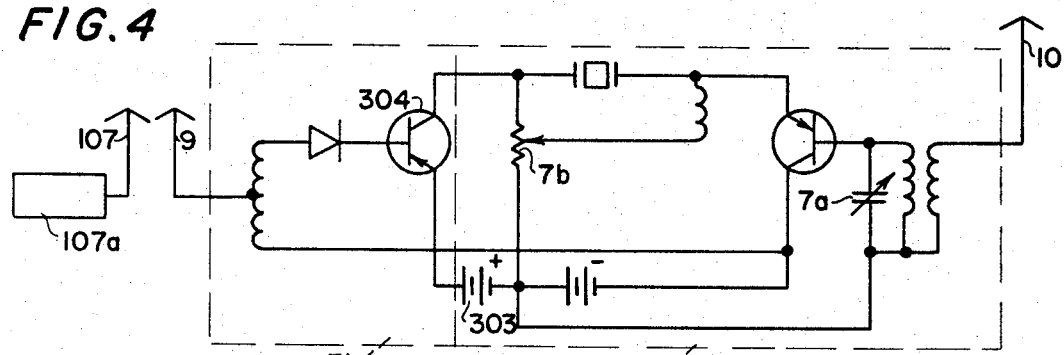

The embodiment of the subminiature transmitter illustrated in FIG. 4 is essentially a transistorized quartz-crystal controlled oscillator energized from its own miniature current source, such as a small cell or battery which may be of the rechargeable type. The battery is switched on under control by the electric field issuing from the antenna 107 connected to a suitable transmitter 107a. For switching the transmitter 3, it is equipped with an electronic switching stage 3b. The operating current of battery 303 is switched on by a switching transistor 304 which is normally nonconductive and is turned on when the antenna 9 receives energy from the antenna 107. The adjustment of the price-proportional transmitter frequency, radiating from the antenna 10, is effected by means of capacitors and resistors of which only one of each is shown at 7a and 7b.

To those skilled in the art, it will be obvious upon a study of this disclosure, that our invention can be given various other embodiments for registering the sales prices or other data of merchandise by providing the merchandise units with respective signal transmitters which issue data-denoting pulses or radiation to a receiving device for decoding and subsequent registering in a business machine.

We claim:

1. The method of entering merchandise data into a registering business machine, which comprises attaching to each individually transportable unit of merchandise an electronic transmitter and radiating therefrom a code signal indicative of the data to be registered; moving the merchandise unit along a given path, the action range of the radiating signal being substantially limited to the vicinity of the moving unit along the path; receiving the code signal at a given locality of said path; and controlling the business machine in response to the received signal to register said merchandise data of said unit.

2. The method of entering merchandise data into a registering business machine, which comprises attaching to each individually transportable unit of merchandise a normally inactive electronic transmitter for radiating a code signal indicative of the data to be registered; transporting the merchandise unit along a given path; activating said transmitter at a given first location of said path so as to commence issuing said code signal for a range of reception limited to the vicinity of, and travelling together with, said merchandise unit; receiving said code signal at a second locality of said path; and controlling the business machine in response to the received signal to register said merchandise data of said unit.

3. The method of entering price data of merchandise into a cash register, which comprises attaching to each unit of merchandise a microelectronic high-frequency transmitter for radiating a code signal indicative of the data to be registered; transporting the merchandise unit along a given path; receiving said signal at a second locality of said path, controlling the cash register in response to the received signal to enter said price data; and thereafter removing the transmitter from the merchandise unit for reuse of the transmitter.

4. The method of entering price data of merchandise into a cash register, which comprises attaching to each unit of merchandise a normally inactive electronic transmitter for radiating a code signal indicative of the data to be registered; transporting the merchandise unit along a given path; activating said transmitter at a given first location of said path so as to commence issuing said code signal for a range of reception limited to the vicinity of, and travelling together with, said merchandise unit; receiving said code signal at a second locality of said path; controlling the cash register in response to the received signal to enter said price data; and thereafter removing the transmitter from the merchandise unit; and subjecting the merchandise at given exits to signal reception for discovery of a non-removed transmitter.

5. With a registering business machine in combination, a system for entering merchandise data into said machine comprising an electronic code-signal radiation transmitter attached, when in use, to one of respective units of merchandise and having a code signal indicative of the data to be registered for said merchandise unit; structure defining a given travel path for merchandise units, each of said transmitters having an effective action range substantially limited to the vicinity of the unit travelling on said path; an electronic receiver responsive to said signals at a given location along said path, and means connecting said receiver to said business machine for controlling it in response to the received signals to register said merchandise data of said unit.

6. In a merchandise-data registering system according to claim 5, said transmitter having a plurality of individually adjustable control members for setting the code signal in accordance with respective bits of said merchandise data to be radiated and a housing incapsulating said transmitter and having openings through which said control members are accessible for adjustment.

7. In a merchandise-data registering system according to claim 5, said transmitter housing having indicator windows, and said control members having respective indicator means visible from the outside through said windows and indicative of the respective bits of the merchandise data to which the transmitter is set.

8. With a cash register in combination, a system for automatically registering the data of merchandise sales transactions, comprising a normally inactive high-frequency code-signal transmitter attached when in use, to one of respective units of merchandise and having a code signal indicative of the data to be registered for said merchandise; forwarding means defining a given travel path for merchandise units; remote control means at a first location of said path for activating said transmitter as said unit passes by; a receiver responsive to said signals at a second location of said path, and means connecting said receiver to the cash register for entering said data in response to the signal received.

9. In a system according to claim 8, said forwarding means comprising two aligned conveyors having low and high speed respectively, said low-speed conveyor being located at the beginning of said path for receiving the units of merchandise, said high-speed conveyor serving to separate said units, said remote control means and said receiver being both located along said high-speed conveyor.

10. In a system according to claim 8, said transmitters being removable from the respective merchandise units to be collected for re-use upon registering of the transaction data, and receiving antenna means located at an exit for response to transmitters passing therethrough.

11. A system according to claim 10, comprising closure means for preventing egress through said exit, and receiver means including said antenna and connected to said closure means for latching the latter in response to transmitter signals received by said antenna.

12. With a cash register in combination, a system for automatically registering the price data of merchandise, comprising labels on respective units of merchandise, each label having a price-exhibiting area and a transmitter attachment area, a high-frequency transmitter firmly but removably attached to said label on said attachment area for radiating, when active, a code signal indicative of the data to be registered, merchandise forwarding means defining a given travel path for merchandise units; a receiver responsive to said signals at a given location along said path, and means connecting said receiver to the cash register for entering said data in response to the signal received.

No references cited.

DARYL W. COOK, *Primary Examiner.*